United States Patent [19]

Hess

[11] Patent Number: 5,517,503
[45] Date of Patent: May 14, 1996

[54] APPARATUS FOR AND METHOD OF TEMPORARY TERMINATION OF A COMMUNICATION RESOURCE

[75] Inventor: Garry C. Hess, Elgin, Ill.

[73] Assignee: Motorola, Inc., Schaumburg, Ill.

[21] Appl. No.: 75,257

[22] Filed: Jun. 11, 1993

[51] Int. Cl.$^6$ .............................. H04L 5/26; H04B 7/212
[52] U.S. Cl. ........................................ 370/95.1; 455/33.1
[58] Field of Search ........................... 370/95.1–3, 69.1, 370/85.7; 379/59–60; 455/33.1–3, 33.4, 54.1, 34.1; 340/825.03; 375/346

[56] References Cited

U.S. PATENT DOCUMENTS

| | | | |
|---|---|---|---|
| 4,870,408 | 9/1989 | Zdunek et al. | 370/95.1 |
| 4,972,506 | 11/1990 | Uddenfeldt | 370/95.1 |
| 5,040,238 | 8/1991 | Comroe et al. | 455/33 |
| 5,111,454 | 5/1992 | Hung et al. | 370/95.3 |
| 5,125,103 | 6/1992 | Grube et al. | 455/33.1 |
| 5,199,031 | 3/1993 | Dahlin | 370/95.3 |
| 5,200,956 | 4/1993 | Pudney et al. | 370/95.1 |
| 5,235,598 | 8/1993 | Sasuta | 370/110.1 |
| 5,239,676 | 8/1993 | Strawczynski et al. | 455/33.2 |
| 5,239,678 | 8/1993 | Grube et al. | 455/34.1 |
| 5,243,598 | 9/1993 | Lee | 370/95.3 |
| 5,327,573 | 7/1994 | Lenchik et al. | 455/14 |

*Primary Examiner*—Benedict V. Safourek
*Assistant Examiner*—Chau T. Nguyen
*Attorney, Agent, or Firm*—Susan L. Lukasik

[57] ABSTRACT

In a first coverage area of a geographically-based frequency-reuse communication system, at least two time division multiplexed communication resources are provided (109 and 111). It is determined whether the first coverage area is supporting no more than a predetermined number of communications (203). When the first coverage area is supporting no more than the predetermined number of communications, transmission of at least one of the communication resources is temporarily terminated (205).

12 Claims, 6 Drawing Sheets

APPARATUS FOR AND METHOD OF TEMPORARY TERMINATION OF A COMMUNICATION RESOURCE

FIELD OF THE INVENTION

This invention relates to radio frequency communications, including but not limited to communications in multiple-site communication systems.

BACKGROUND OF THE INVENTION

A trunked radio system is a two-way radio system that allocates a limited number of communication resources, such as radio frequencies or time slots in a Time Division Multiplexed (TDM) communication system, on a time-shared basis amongst many users throughout a limited geographic area. The users time-share these communications resources on an as-needed basis by the users requesting a central controller for the privilege of temporarily using a resource to communicate with other subscribers to the system. If a communications resource is available for use when a user requests one, the controller grants the request to the requesting user by broadcasting a message on a control channel throughout the coverage area. The requesting user may thereafter communicate with either a specific other user with whom communication was requested or other group related users, depending upon instructions broadcast from the resource controller.

Typically, the number of communication resources allocated to a geographic area is severely limited. The geographic area for which coverage is desired is often broken up into a plurality of adjacent areas called cells. A communication resource may then be reused throughout the geographic area in non-adjacent cells, thus providing a more efficient use of the limited resources available in the system.

The talk-out Carrier to Interference ratio (C/I) of current analog cellular systems is substantially better during off-peak traffic periods than during busy periods. This is so because the current approach uses Frequency Division Multiplexed (FDM) communications with a one-to-one relationship between communication resource and carrier/transmitter. Unassigned communication resources contribute no interference power to other cochannel users because the transmitter of an unassigned communication resource is typically off.

In digital TDM systems, where multiple communication resources are handled by the same base carrier/transmitter, when some of the communication resources are idle, the talk-out interference contribution will not necessarily change. This is particularly important because the talk-out link is generally inferior to the talk-in link, where interference levels naturally vary with the traffic load. This link imbalance is enhanced by the ease of including diversity reception at the base and the difficulty of including it at the subscriber units.

Although the base transmitter could be pulsed off during idle time slots, such a solution is unattractive for numerous reasons, including added transmitter design difficulties and complicated subscriber monitoring of hand-off candidates.

Accordingly, there is a need for a method of reducing cochannel interference during times of light traffic on multisite TDM systems.

BRIEF DESCRIPTION OF THE DRAWINGS

FIG. 2–1 is a flowchart showing termination of transmission of a communication resource in accordance with the invention.

FIG. 2—2 is a flowchart showing identification of a communication resource to be terminated in accordance with the invention.

FIG. 3–1, FIG. 3–2, FIG. 3—3, and FIG. 3-4 are diagrams showing frequency non-use patterns in accordance with the invention.

DESCRIPTION OF A PREFERRED EMBODIMENT

The following describes an apparatus for and method of temporarily terminating transmission of a communication resource when a coverage area needs fewer than all of its communication resources to support all of its requested communications. Numerous frequency non-use patterns are provided that advantageously designate a frequency for non-use by minimizing cochannel interference.

In the preferred embodiment, a plurality of two-way radio base stations, each servicing a first coverage area, has a TDM radio transmitter, such that each two-way radio base station is capable of supporting a plurality of TDM communications. A communication load counter counts the number of time division multiplexed communications currently being supported by the two-way radio base stations. A controller, operably coupled to the communication load counter, provides a transmitter deactivation signal to a two-way radio base station when the communication load counter indicates that capacity of at least one of the two-way radio base stations is temporarily unneeded, such that when the capacity of a two-way radio base station is temporarily unneeded, a two-way radio base station will be temporarily deactivated.

Figure 1:
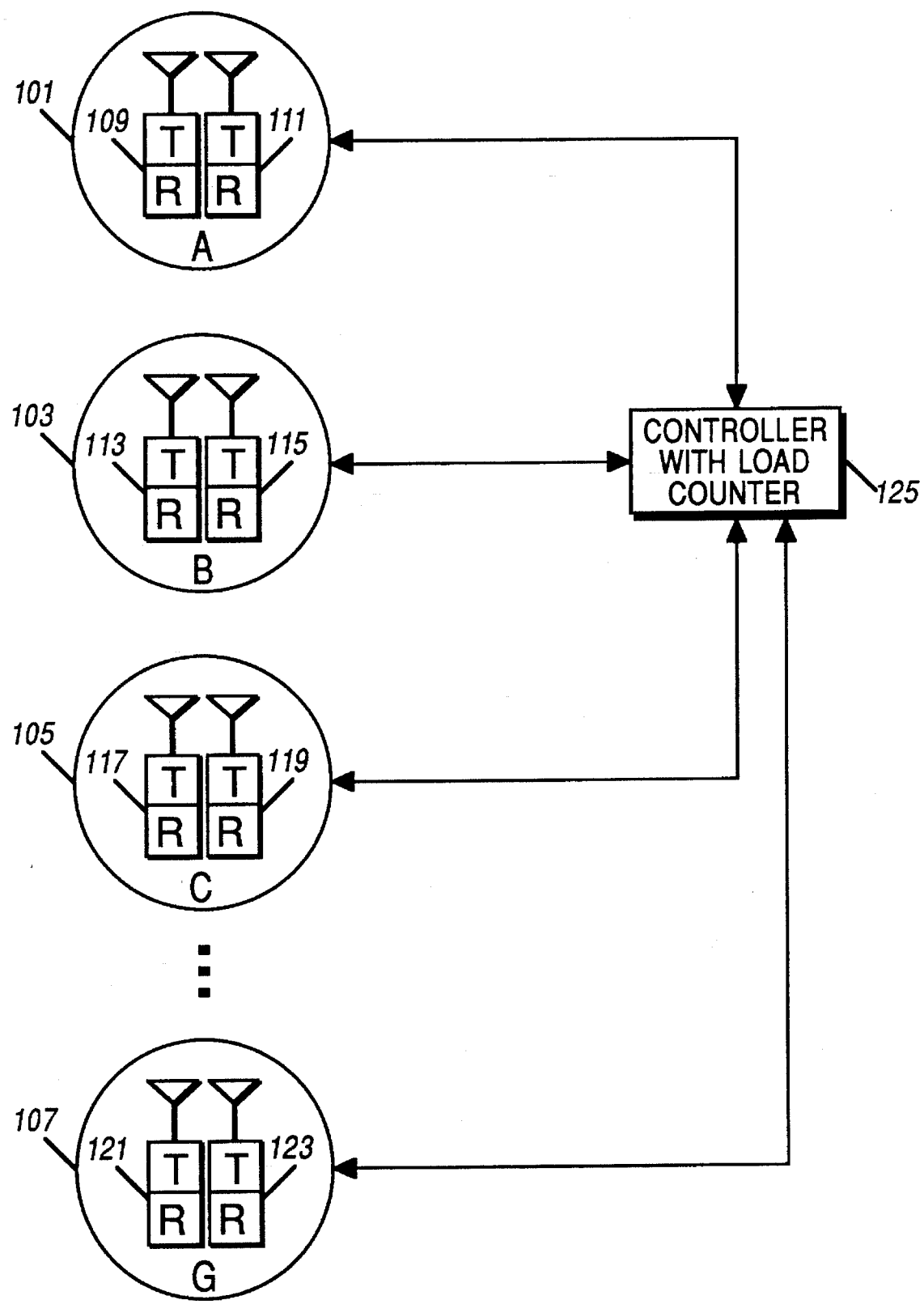
FIG. 1 is a block diagram of a communication system in accordance with the invention.

As shown in FIG. 1, there is a communication system comprised of at least four base sites 101, 103, 105, and 107 and a (central) controller 125 with a load counter. The controller 125 is a conventional trunked system controller and has a load counter that counts the number of communication messages being serviced by each base site 101, 103, 105, and 107. Each base site has two TDM transmitter-receiver base stations. The base stations are conventional base stations that are controllable by a controller, including terminating transmission by a signal from the controller. For example, base site A 101 has two base stations 109 and 111. The TDM frequency used for the first base station 109 is $f_a$ and the frequency used for the second base station 111 is $f_b$. The remaining base sites B 103, C 105, and G 107 each have base sites with $f_a$ in one of its base stations 113, 117, and 121 and frequency $f_b$ in its other base station 115, 119, and 123. Although only two TDM frequencies are shown in the drawings, the invention is easily applied to three or more TDM frequencies at each base site by repeating the same steps as described below.

Figures 1, 2:
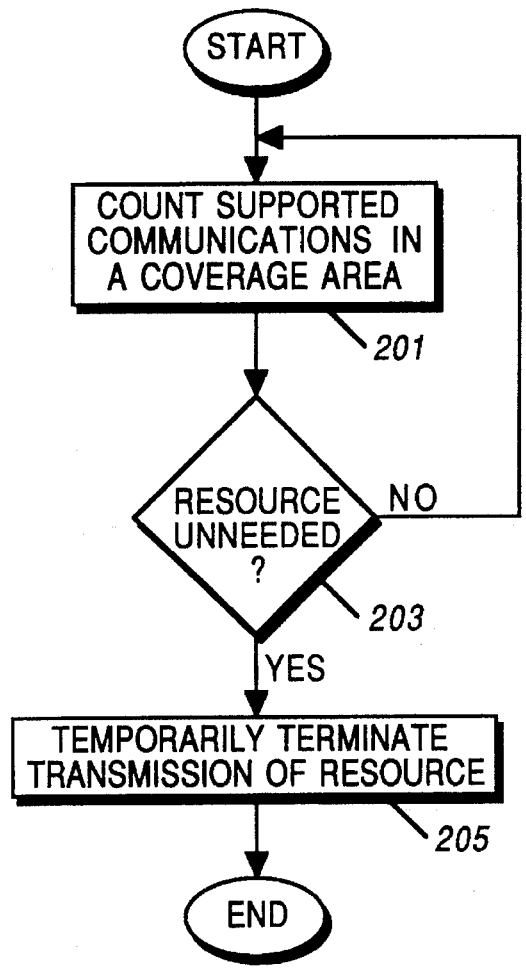
Figure 2:
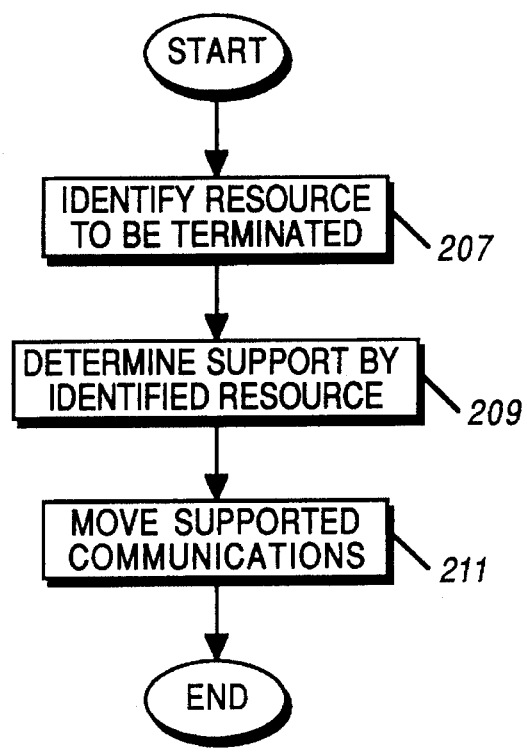

A method of termination of transmission of a communication resource is shown in FIG. 2–1. Using the communication system shown in FIG. 1, there are provided two time division multiplex communication resources. Each of these TDM resources is used in the coverage area of base site A from FIG. 1. The controller with the load counter 125 counts the supported communications in each coverage area, for example, for base site A 101. At step 203, the controller determines if there is a resource, either $f_a$ or $f_b$, from base site A 101, which is unneeded. Another way of stating this is that the controller 125 determines whether the coverage area is currently supporting no more than a predetermined number of communications. This predetermined number of communications would approximately equal the capacity of at least one of the TDM communication resources, while insuring that a control channel is still available for the base site. Thus, the controller 125 automatically determines whether the coverage area is supporting a number of communications such that the capacity of one communication resource is unneeded. If there were three or more base stations in each base site, two communication resources may be considered unneeded if the capacity of two communication resources is unneeded. For example, if each of three base stations supports six communications, and there are only five communications and a control channel that are currently supported, then two of the communication resources are considered indeed.

If at step 203 a resource is unneeded, the procedure continues with step 205 where the controller 125 temporarily terminates transmission of a communication resource at step 205 by providing a transmitter deactivation signal to the base station sourcing the communication resource. Termination of transmission of a communication resource typically comprises powering down of the base station that is sourcing the communication resource. For example, if it is determined that $f_a$ may be temporarily terminated at site A 101, the first base station 109 will power down its transmitter. How the controller determines which of the resources is terminated is shown in FIG. 2—2, FIG. 3–1, FIG. 3–2, FIG. 3—3, and FIG. 3–4, as are described later.

Identification of a communication resource to be terminated is shown in FIG. 2—2, which describes the process in step 205 of a controller temporarily terminating transmission of resources. At step 207, the controller 125 identifies a communication resource, the transmission of which is to be temporarily terminated pursuant to a predetermined criterion. The predetermined criterion may be compromised of pre-identification of a particular communication resource based on a frequency non-use pattern as is shown in FIG. 3–1, FIG. 3–2, FIG. 3—3, and FIG. 3–4. The pre-identification of the particular communication resource may be altered on a daily basis. Such altering prevents one communication resource base station from being overused while other base stations are relatively unused. This may be accomplished by inverting the frequency non-use pattern every day if there are two frequencies or cycling daily the frequency non-use pattern through each of the different frequencies when there are three or more frequencies. At step 209, the controller 125 determines whether any communications are supported by the identified communication resource, and if so, moves such communications to a communication resource that is to remain in service, such that such communications continue to be supported by the communication system at step 211.

In FIG. 3–1, FIG. 3–2, FIG. 3—3, and FIG. 3–4, each of which show predetermined geographically-based frequency non-use patterns, the base site is designated by an upper-case letter, and the cell is designated by a reference numeral in the 300s. For example, base site A 101 is shown in cell 301. Each cell includes a single base site, the base stations of which cover the needs of that cell.

Figures 1, 3:
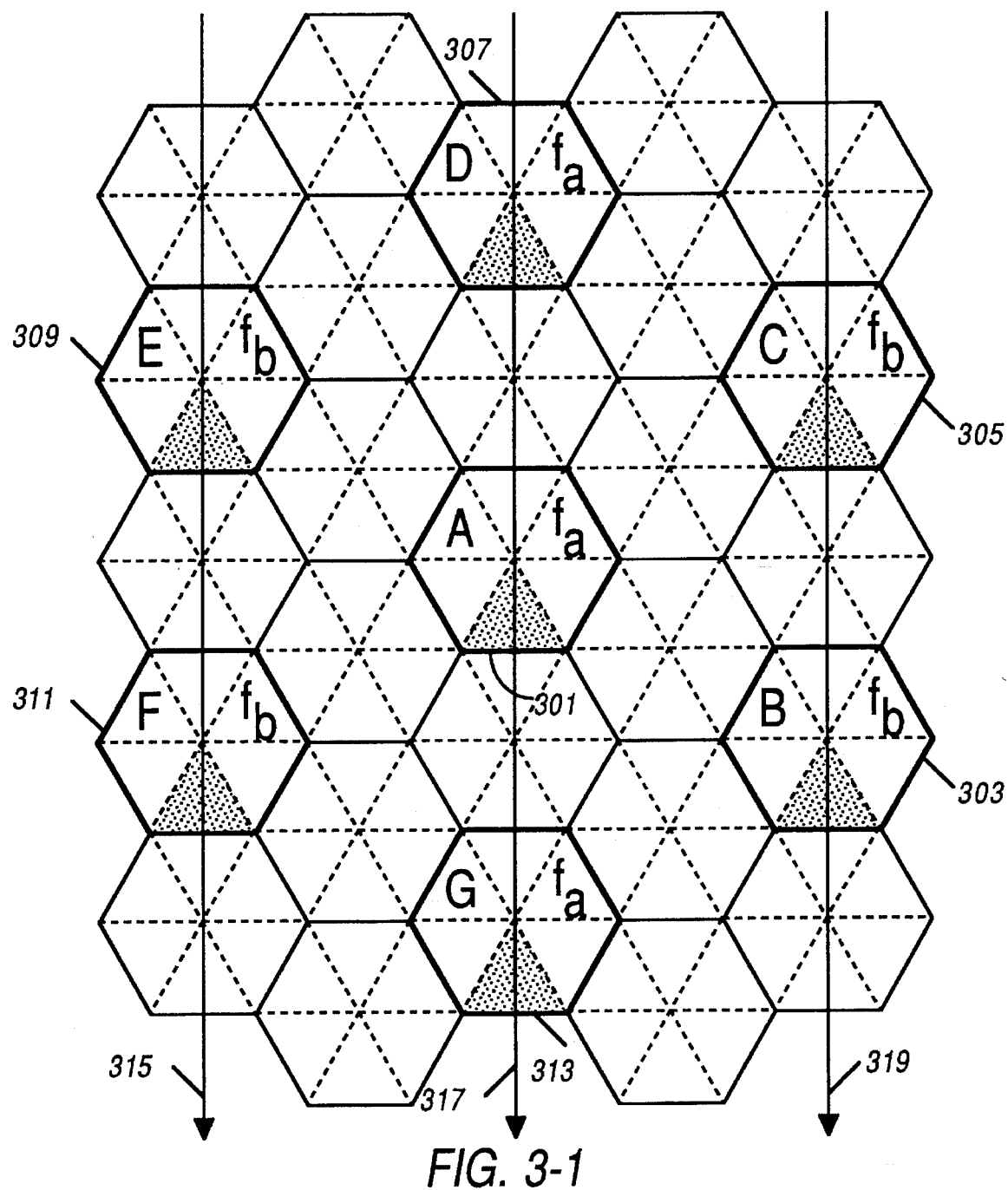
Figures 2, 3:
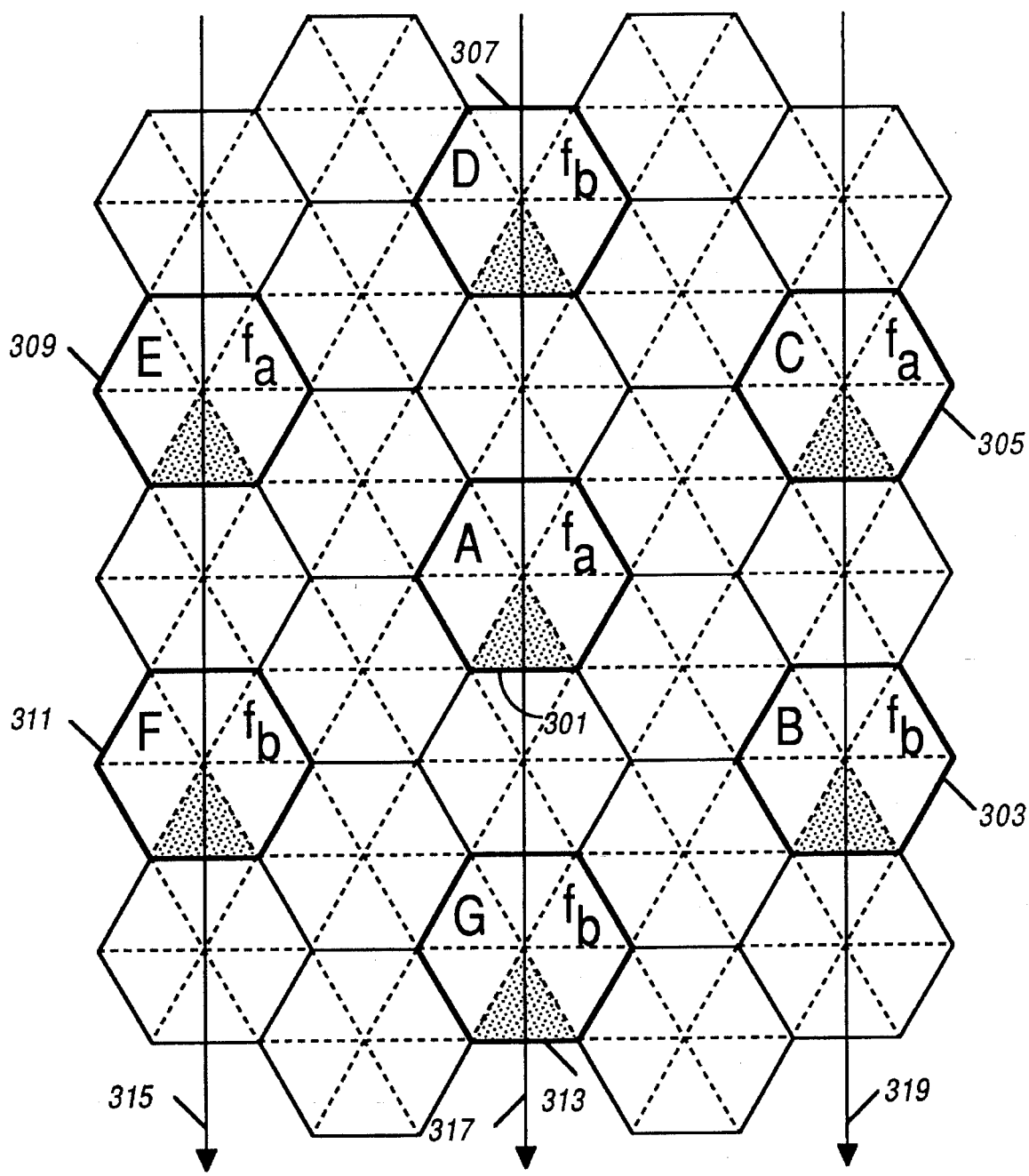
Figure 3:
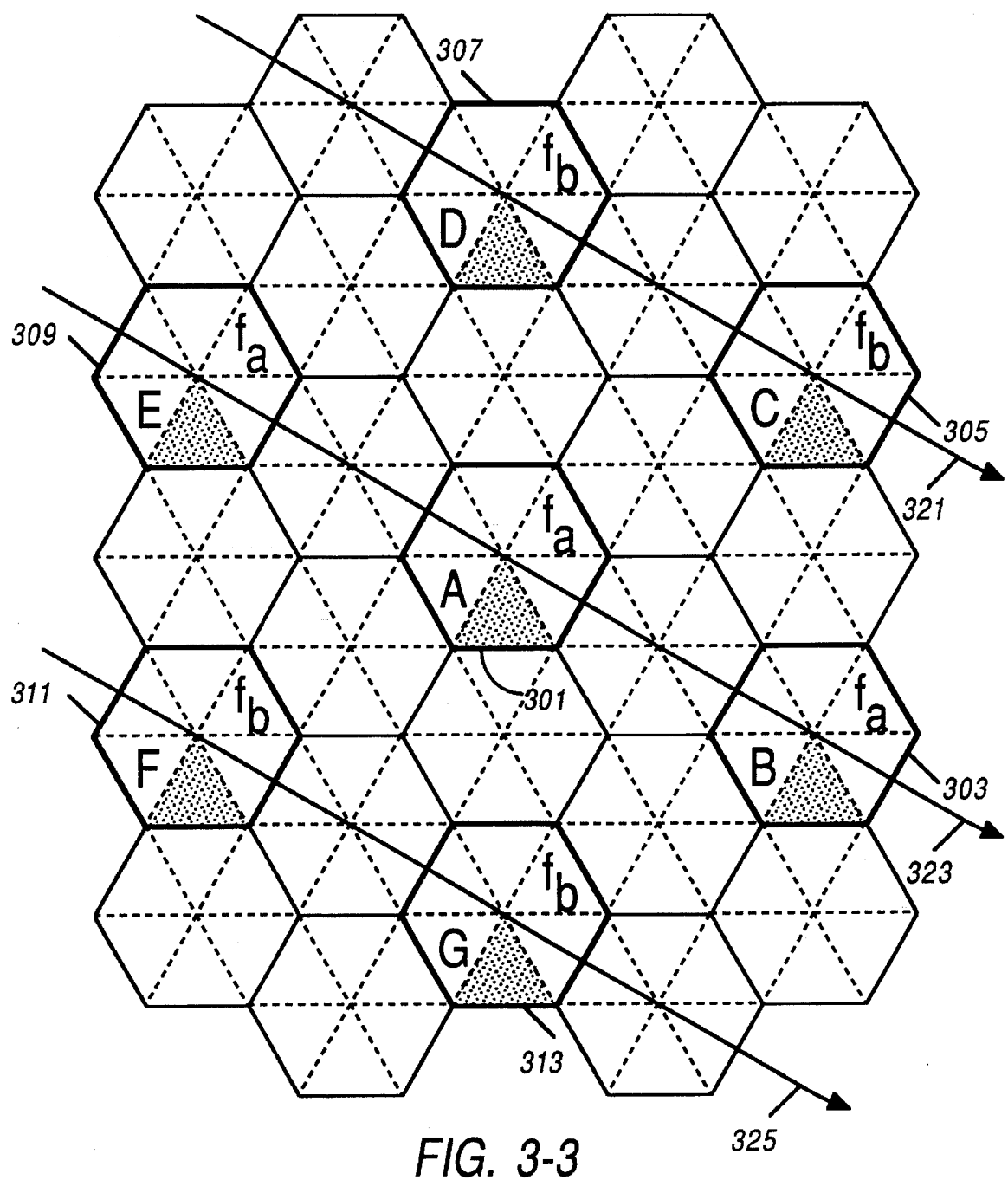

Numerous ways exist to determine which frequencies may be predetermined for non-use. Some ways are more advantageous then other ways in that there may be better reduction of interference due to use in other nearby sites. FIG. 3–1 shows a frequency non-use pattern in which the designated frequency is alternated with the columns. In the first 315 and third 319 columns, the designated non-use frequency is $f_b$, for base site E in cell 309, base site F in cell 311, base site C in cell 305, and base site B in cell 303. Base site D in cell 307, base site A in cell 301 and base site G in cell 313 are in column 317, all use frequency $f_a$ as their designated non-use frequency. Hence, alternating columns have alternating frequency non-use designations.

Another more advantageous frequency non-use pattern is shown in FIG. 3–2. In FIG. 3–2, the geographically based frequency non-use pattern more effectively accommodates communication resource radiation directivity to thereby aid in reducing interference due to frequency reuse. The direction of the radiation of the communication resource is shown by the shaded region in each of the base sites as shown in FIG. 3–2. Extending these shaded regions, for example, taking base site D in cell 307 and base site A in cell 301, base site A is in the direction of the radiation of base site D's base stations. Hence, it would be advantageous not to use the same non-use frequency in base site A in cell 301 that is used in base site D in cell 307. As can be seen in FIG. 3–2, the non-use frequency is alternated in each column. In column 315, base site E in cell 309 has non-use frequency $f_a$ and base site F in cell 311 has non-use frequency $f_b$. Alternating base sites D in cell 307 and G in cell 313 use $f_b$ as their non-use frequency, and base site A 301 uses $f_a$ as its non-use frequency. Column 319 duplicates the frequency pattern of column 315 in that base site C in cell 305 uses $f_a$ and base site B in cell 303 uses $f_b$ as its non-use frequency.

FIG. 3—3 shows yet another advantageous frequency non-use pattern that takes into account both of the previous advantages of alternating columns and alternating within the column the frequency non-use frequencies. In FIG. 3—3, descending diagonals contain the same frequency. Base site D in cell 307 and base site C in cell 305 in descending diagonal 321 both use $f_b$ as their non-use frequency. The adjacent diagonal 323 uses $f_a$ as its non-use frequency, where diagonal 323 contains base site E in cell 309, base site A in cell 301, and base site B in cell 303. The adjacent diagonal 325 to diagonal 323 uses the opposite frequency or $P_n$ as its non-use frequency. This descending diagonal 325 contains base site F in cell 311 and base site G in cell 313.

Figures 3, 4:
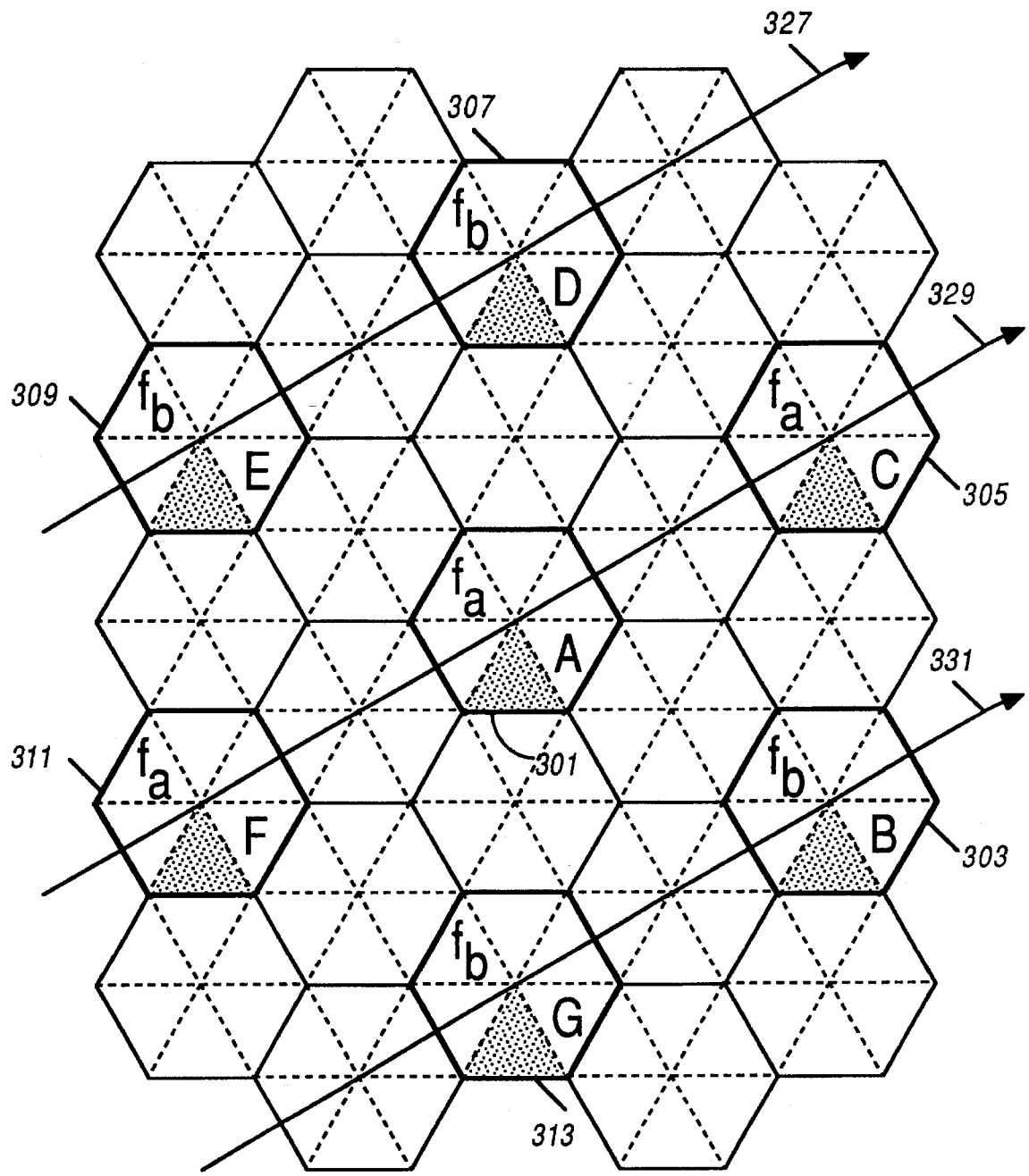

As shown in FIG. 3–4, the same non-use frequency is used in alternating ascending diagonals, for example, base sites in diagonals 327 and 331 use $f_b$ as a non-use frequency and base sites in diagonal 329, in between diagonals 327 and 331, use $f_a$ as their non-use frequency. The frequency non-use patterns shown in FIG. 3—3 and 3–4 have comparable carrier to interference ratio performance due to their mirror-image nature, as one of ordinary skill in the art would expect.

The same application of frequency non-use patterns is applied to the other cells in the system, taking into account the TDM frequencies at each base site. Hence, each cell in the entire coverage area has its own designated non-use frequency.

The invention achieves an improvement in area talk-out carrier to interference ratio by using alternate carrier frequency groups on the ascending or descending diagonals of the site layout plans. Hence, when there is light traffic, better CII performance may be achieved by a frequency non-use pattern that is advantageously chosen to reflect the geography of the area and minimizing cochannel interference.

What is claimed is:

1. A method comprising the steps of:
   in a first coverage area of a geographically-based frequency-reuse communication system, providing at least two time division multiplexed radio frequency (RF) communication resources;

determining whether no more than a predetermined number of RF communications are supported in the first coverage area;

when no more than the predetermined number of RF communications are supported in the first coverage area, determining which of the at least two time division multiplexed RF communication resources is to be temporarily terminated, thereby selecting at least one of the RF communication resources;

determining whether any RF communications are currently supported by the at least one of the RF communication resources;

when RF communications are currently supported by the at least one of the RF communication resources, moving such RF communications to an RF communication resource that is to remain in service, such that such RF communications continue to be supported within the communication system;

temporarily terminating any transmission on the at least one of the RF communication resources, thereby minimizing. channel RF interference.

2. A method comprising the steps of:

in a first coverage area of a geographically-based frequency-reuse communication system, supporting at least one RF communication on at least one of at least two time division multiplexed radio frequency (RF) communication resources each having a capacity, where capacity denotes how many RF communications are able to be supported on an RF communication resource;

automatically determining whether a number of RF communications are supported in the first coverage area such that the capacity of at least one of the RF communication resources is unneeded;

when at least one of the RF communication resources is unneeded, and when RF communications are currently being supported by the at least one of the RF communication resources, moving such communications to an RF communication resource that is to remain in service, such that such RF communications continue to be supported within the communication system;

temporarily terminating any transmission on the at least one RF communication resource that is unneeded, thereby minimizing cochannel RF interference.

3. The method of claim 2, wherein the step of temporarily terminating transmission on at least one RF communication resource that is unneeded includes the step of identifying a particular RF communication resource, the transmission on which is to be temporarily terminated, pursuant to a predetermined criterion.

4. The method of claim 3, wherein the predetermined criterion comprises pre-identification of the particular RF communication resource.

5. The method of claim 4, wherein the pre-identification of the particular RF communication resource is altered on a daily basis.

6. The method of claim 4, wherein the predetermined criterion comprises compliance with a predetermined geographically-based frequency non-use pattern.

7. The method of claim 6, wherein the at least two time division multiplexed RF communication resources are radio frequency resources, and wherein the geographically-based frequency-non-use pattern accommodates RF communication resource radiation directivity, to thereby aid in reducing interference due to frequency reuse.

8. A communication system, comprising:

a plurality of two-way radio base stations each servicing a first coverage area, each two-way radio base station having a time division multiplexed radio transmitter, such that each two-way radio base station is capable of supporting a plurality of time division multiplexed radio frequency (RF) communications in the first coverage area, and the capacity of a two-way radio base station is the number of the plurality of time division multiplexed RF communications the two-way radio base station is capable of sourcing in the first coverage area;

a communication load counter that counts the number of time division multiplexed RF communications currently being supported by the plurality of two-way radio base stations in the first coverage area;

a controller operably coupled to the communication load counter and arranged and constructed such that:

when the communication load counter indicates to the controller that the capacity of at least one two-way radio base station of the plurality of two-way radio base stations is temporarily unneeded, the controller determines whether any RF communications are currently being supported by the at least one two-way radio base station;

when RF communications are currently being supported by the at least one two-way radio base station, the controller moves such RF communications to an RF communication resource sourced by one of the plurality of two-way radio base stations that is to remain in service, such that such RF communications continue to be supported within the communication system; and the controller provides a transmitter deactivation signal to the at least one two-way radio base station, such that when the at least one two-way radio base station receives the transmitter deactivation signal, the at least one two-way radio base station is temporarily deactivated, thereby minimizing cochannel RF interference.

9. The communication system of claim 8, wherein the controller identifies a particular RF communication resource that is sourced by the at least one two-way radio base station of the plurality of two-way radio base stations, pursuant to a predetermined criterion.

10. The communication system of claim 9, wherein the predetermined criterion comprises pre-identification of the particular RF communication resource.

11. The communication system of claim 10, wherein the pre-identification of the particular RF communication resource is altered on a daily basis.

12. The communication system of claim 10, wherein the predetermined criterion comprises compliance with a predetermined geographically-based frequency non-use pattern.

* * * * *